United States Patent [19]

Espinoza et al.

[11] Patent Number: 5,932,019
[45] Date of Patent: Aug. 3, 1999

[54] METHOD FOR CLEANING AND MINIMIZING THE BUILDUP OF SET GYPSUM

[75] Inventors: Therese A. Espinoza, Wood Dale; Richard B. Stevens, Lakewood; Charles J. Miller, McHenry, all of Ill.; Friedrich Failmezger, Dubuque, Iowa

[73] Assignee: United States Gypsum Company, Chicago, Ill.

[21] Appl. No.: 08/885,070

[22] Filed: Jun. 30, 1997

[51] Int. Cl.$^6$ .............................. B08B 3/12; C23G 1/02
[52] U.S. Cl. .................................... 134/1; 134/41
[58] Field of Search ............................ 134/1, 41

[56] References Cited

U.S. PATENT DOCUMENTS

| | | | |
|---|---|---|---|
| 4,189 | 9/1845 | Ritterbandt | 134/41 |
| 1,832,979 | 6/1929 | George | 134/41 |
| 2,113,370 | 4/1938 | Dunn et al. | 106/28 |
| 2,216,207 | 10/1940 | Menaul | 106/28 |
| 3,150,081 | 9/1964 | Haslam | 134/41 |
| 3,223,082 | 12/1965 | Smith | 128/91 |
| 3,297,601 | 1/1967 | Maynard et al. | 260/17.4 |
| 3,520,708 | 7/1970 | Chambers et al. | 106/110 |
| 3,623,991 | 6/1969 | Sabatelli et al. | 252/99 |
| 3,639,279 | 2/1972 | Gardner et al. | 252/86 |
| 3,852,083 | 12/1974 | Yang | 106/111 |
| 4,075,374 | 2/1978 | Jorgenson et al. | 427/355 |
| 4,096,869 | 6/1978 | Lawson | 134/3 |
| 4,294,622 | 10/1981 | Brown | 106/314 |
| 4,357,254 | 11/1982 | Kapiloff et al. | 252/181 |
| 4,494,990 | 1/1985 | Harris | 106/90 |
| 4,496,470 | 1/1985 | Kapiloff et al. | 252/181 |
| 4,806,259 | 2/1989 | Amjad | 252/80 |
| 4,849,018 | 7/1989 | Babcock et al. | 106/104 |
| 5,116,222 | 5/1992 | Futami et al. | 433/48 |
| 5,183,513 | 2/1993 | Sajewski | 134/22.12 |
| 5,263,541 | 11/1993 | Barthorpe et al. | 166/279 |
| 5,366,547 | 11/1994 | Brabston et al. | 106/690 |
| 5,449,249 | 9/1995 | Husten | 405/128 |
| 5,702,693 | 12/1997 | Simmons | 424/78.03 |

FOREIGN PATENT DOCUMENTS

| | | | |
|---|---|---|---|
| 2-239982 | 10/1990 | Japan | C04B 9/04 |
| 1013432 | of 0000 | U.S.S.R. | |
| WO 95/31415 | 4/1995 | WIPO | C04B 22/16 |
| WO 96/38394 | 5/1996 | WIPO | C04B 28/16 |

OTHER PUBLICATIONS

Ciba–Geigy Product Information Bulletin Chel®DTPA/Chel®DTPA 41 (2 pages).

Handbook of Chemistry & Physics; 55th Ed.; 1974–1975 CRC Press, pp. D–61 and F–93.

Durham et al., "The Acid Dissociation Constants of Diethylenetriaminepentaacetic Acid and the Stability Constants of Some of its Metal Chelates", *J. Am. Chem Soc.*, 80, pp. 4812–4817 (1958).

*Primary Examiner*—Jill Warden
*Assistant Examiner*—Yolanda E. Wilkins
*Attorney, Agent, or Firm*—Arnold, White & Durkee; David F. Janci; John M. Lorenzen

[57] ABSTRACT

The present invention relates to a method for minimizing the buildup of set gypsum on a tool used to apply a calcium sulfate hemihydrate-containing composition to a surface as well as to a method for cleaning a tool having set gypsum deposited thereon. The method for cleaning a tool having set gypsum deposited thereon comprises the steps of (a) contacting the tool with a cleaning solution having a pH of less than about 7, said cleaning solution which comprises a non-calcium phosphate, water, and, optionally, a pH modifier; (b) optionally agitating the solution; (c) removing the tool from the cleaning solution; and (d) rinsing the tool with water. The method for minimizing the buildup of set gypsum on a tool further comprises step (e) using the tool to apply a calcium sulfate hemihydrate-containing composition. An additional step (f), flushing the tool with water, may also be employed. Optionally, steps (a) through (e) or (a) through (f) may be repeated during the application of the calcium sulfate hemihydrate-containing composition. Examples of non-calcium phosphates which may be used in the cleaning solution are sodium, potassium, or ammonium salts such as tetrasodium pyrophosphate, tetrapotassium pyrophosphate and sodium tripolyphosphate.

42 Claims, No Drawings

METHOD FOR CLEANING AND MINIMIZING THE BUILDUP OF SET GYPSUM

BACKGROUND OF THE INVENTION

The present invention relates to a method for minimizing the buildup of set gypsum (calcium sulfate dihydrate) on a tool used to apply a calcium sulfate hemihydrate-containing composition (e.g., calcined gypsum) to a surface as well as to a method for cleaning a tool having set gypsum deposited thereon.

The use of drywall or wallboard construction, i.e., a non-plastered surface, has become increasingly popular over the years to the extent that it is estimated that a substantial amount of all new residential and commercial construction is finished in this manner. The usual drywall construction consists of gypsum wallboard panels secured to supporting framing members.

Gypsum wallboard is conventionally made by enclosing a core of an aqueous slurry of calcined gypsum between two paper layers. After the slurry has set and dried, the fabricated sheet is cut and the resulting panels are ready for use. It ordinarily is not practical to make wallboards over four feet wide and about eight to twelve feet in length. As a result there are a considerable number of joints between boards, and these joints must be reinforced and concealed for satisfactory appearance. According to one prior art practice, batten strips were applied over the joints for this purpose. This was found to be unsatisfactory as the batten strips tended to accentuate the joints.

In order for wallboard use to be acceptable it is necessary to obtain a smooth finish wall construction similar to that obtained with conventional wet plaster methods. Accordingly, great effort has been made to conceal the joints between the drywall plasterboards or wallboards in order to achieve an overall smooth and continuous wall. To this end, cloth, metal and finally paper tapes have been cemented over the joints between the boards to reinforce the joints, and a finishing coat of cementitious material applied over the tapes to conceal the tape and to provide a smooth surface. The preferred conventional method is to recess the adjoining edges of the gypsum wallboard, apply an adhesive joint compound and embed the paper tape in the joint compound. Several finishing or feathering layers of the joint compound are applied to conceal the tape. Finally, the work is sanded to produce a smooth surface similar to the conventional wet plaster wall.

The adhesives or binding material commonly used in prior art joint compounds were generally based on proteins as the primary binders. Casein or certain refined soya proteins solubilized in water by alkaline materials were used extensively for this purpose. More recent materials are ethylene vinyl acetate and polyvinyl acetate emulsions. When properly blended with fillers such as mica, clays, limestone, preservatives and thickening agents such as natural gums, a joint compound is obtained which is capable of binding the joint tapes in place and providing a smooth surface. However, this type of joint compound has the disadvantage of requiring extended periods of time to dry.

The conventional procedure for obtaining a good smooth finish is to apply the joint compound in several layers or coats. The first layer is primarily for the purpose of filling the space between the wallboards and for adhering the tape to the adjoining boards. The second layer is applied over the tape to form as smooth and as even a surface as is possible in order to provide a continuous surface coplanar with the board. However, due to shrinkage of the joint compound upon drying and irregularities due to trowelling, etc., a third or finishing layer is generally applied after the second coat has dried.

Due to the necessity for each layer to become substantially dry before the subsequent one can be applied, it is obvious that considerable periods of time are required to achieve an ultimate smooth drywall. Under certain environmental conditions, such as cold, damp weather, days or weeks may be required before the wall is completed. Such delays slow up the construction of a building and delay its eventual sale and occupancy.

Moreover, because of the slow drying of known adhesive type joint compounds shrinkage problems are magnified, contributing further to the difficulty of achieving a smooth wall surface. Shrinkage of the prior art joint compounds upon drying is especially serious when a second coat is applied over an earlier coat which is not completely dried. The areas of the earlier coating which are not thoroughly dry at the time of application of the second coat subsequently shrink, sometimes even after the wall is finished and decorated. Where delayed shrinkage is excessive, it necessitates a return to the job for refinishing and redecorating.

Joint compounds which chemically set and harden quickly ("setting type" joint compounds) have been developed which greatly decrease the time required for gypsum drywall construction. In a setting type joint compound, calcined gypsum (calcium sulfate hemihydrate) is utilized as a substantial proportion of the filler material. The compound is prepared in dry powder form and mixed with water when ready for use. The water reacts with the calcium sulfate hemihydrate to form set gypsum or calcium sulfate dihydrate. In this compound the setting time is considerably shorter than the time required for the drying type to dry. This has considerably reduced the time required for preparing a suitable joint from days or weeks to hours. Also, setting-type compounds exhibit desirably much less shrinkage than drying-type compounds.

Examples of tools typically used to apply calcium sulfate hemihydrate-containing compositions such as joint compounds are handheld tools and mechanical taping tools such as the joint compound application tools manufactured by Ames Taping Tool Systems Co., e.g., AMES® AUTO TAPER, AMES® FLAT FINISHER, and AMES® LOADING PUMP.

Joint compounds are preferably applied using mechanical tools because they improve the speed and quality of the joint finishing process. A disadvantage to the use of setting type joint compounds is that they are difficult to use with mechanical application tools because the joint compound accumulates in hard-to-clean corners, tubes and valves. Such residue does not interfere with the normal operation of mechanical tools when used with the drying type compounds because the drying type residue is easily washed away during cleaning of the tool. However, the setting type compound chemically hardens making the residuum exceptionally difficult to remove from the equipment and eventually rendering the tools unusable. Many have modified the tool cleaning procedures to include frequent flushing and disassembly of the mechanical tools to prevent the accumulation of set residue—procedures which are time-consuming and tedious.

Therefore, a method which would allow a setting type joint compound to be used with mechanical tools would be extremely advantageous.

SUMMARY OF THE INVENTION

The present invention relates to a method for minimizing the buildup of set gypsum (calcium sulfate dihydrate) on a tool used to apply a calcium sulfate hemihydrate-containing composition (e.g., calcined gypsum) to a surface as well as to a method for cleaning a tool having set gypsum deposited thereon. The inventors have found that the method of the present invention makes it much easier to clean a setting-type joint compound out of a tool, even if the tool has set for days after use, without cleaning, such that the joint compound in the tool has fully set and dried. The method for cleaning a tool having set gypsum deposited thereon comprises the steps of (a) contacting the tool with a cleaning solution having a pH of less than about 7, said cleaning solution which comprises a non-calcium phosphate, water, and, optionally, a pH modifier; (b) optionally agitating the solution; (c) removing the tool from the cleaning solution; and (d) rinsing the tool with water. The method for minimizing the buildup of set gypsum on a tool further comprises step (e) using the tool to apply a calcium sulfate hemihydrate-containing composition. An additional step (f), flushing the tool with water, may also be employed. In the method for minimizing the buildup of set gypsum, steps (a) through (e) or (a) through (f) may be repeated during the application of the calcium sulfate hemihydrate-containing composition.

DETAILED DESCRIPTION OF THE INVENTION

The cleaning solution to be used with the methods of the present invention desirably comprises at least about 0.1 wt. % non-calcium phosphate, preferably, from about 0.1 wt. % to about 5 wt. %, more preferably from about 0.1 wt. % to about 2 wt. % even more preferably from about 0.5 wt. % to about 1 wt. % and most preferably about 0.75 wt. %. The non-calcium phosphate is a sodium, potassium, or ammonium salt. Examples of non-calcium phosphates which may be used are tetrasodium pyrophosphate ($Na_4P_2O_7$), tetrapotassium pyrophosphate ($K_4P_2O_7$), sodium tripolyphosphate ($Na_5P_3O_{10}$), $Na_3PO_4$, and $Na_2HPO_4$. The preferred non-calcium phosphate is tetrapotassium pyrophosphate.

The pH of the cleaning solution is less than 7, preferably from about 3 to less than about 7, and most preferably about 4. Where the cleaning is used for minimizing the buildup of set gypsum on the tool, the pH modifier should be one which does not interfere with the solubility of the calcium sulfate hemihydrate in the calcium sulfate hemihydrate-containing composition. An example of a pH modifier is citric acid, but other typical acidic pH modifiers should serve the purpose also.

In a preferred embodiment, the cleaning solution comprises about 0.7 wt. % of a non-calcium phosphate which is tetrapotassium pyrophosphate, a pH modifier which is citric acid, and has a pH of about 4.

Examples of ways in which the mechanical tool may be placed into contact with the cleaning solution are immersion, spray, and high pressure spray. The amount of time that the cleaning solution must be in contact with the mechanical tool used to apply the calcium sulfate hemihydrate-containing composition and the degree of agitation it may be desirable to apply will vary according to the thickness and amount of set gypsum on the tool and the degree of set of the gypsum. Examples of ways in which the cleaning solution may be agitated are by the use of ultrasonic energy, mechanical agitation and bubbling, e.g., with air.

Step (f), flushing or rinsing the tool with water, is useful for ridding the tool of most larger portions of the calcium sulfate-containing composition which may be present.

The methods of the present invention are beneficial for both pretreating a tool to prevent or minimize the buildup of set gypsum on the tool and for cleaning a tool which already has set gypsum deposited on it. An example of a calcium sulfate hemihydrate-containing composition which may be applied by a tool and with which the methods of the present invention may be beneficial comprises calcium sulfate hemihydrate, a thickener, a binder, and, optionally, a clay and/or a filler. This calcium sulfate hemihydrate-containing composition usually has a water-content of less than about 40 wt. % in a composition intended to be used to finish the joints between adjacent wallboards. When this calcium sulfate hemihydrate-containing composition sets, it creates an interlocking matrix of crystals of set gypsum.

The invention can be practically applied to any of the joint compound application tools typically employed in the art, for example, those mentioned under the Background of the Invention above. Such tools can comprise various metals and alloys such as, e.g., brass, aluminum, and galvanized metals; plastics; or other materials as is well known in the art.

The following examples disclose preferred embodiments and the best mode for carrying out the invention known to the inventors at this time and compare their results with those of embodiments outside the scope of the invention. These examples are presented to describe preferred embodiments and utilities of the present invention and are not meant to limit the present invention unless otherwise stated in the claims appended hereto. All concentrations in the examples are by weight based on the total weight of the solution unless otherwise indicated.

EXAMPLE 1

Test of Set Disruption for Tuf Set™ 20

A solution which can be applied to the tool after usage to disrupt the normal setting action of the setting-type joint compound residue accumulated in the tool, would provide the benefit of easier tool cleaning. Cleaning solutions having different concentrations of citric acid and TKPP were tested for the retardation of the set of a joint compound. The joint compound used was Tuf Set™ 20 prepared at a concentration of 122 cc $H_2O$/300 g Tuf Set™ 20 and having a viscosity of 540 BU and a 23 minute Vicat set (measured as specified in ASTM # C191; 300 g needle). A cup having a volume of 25.97 cc was filled with the joint compound mixture and allowed to sit for 5 minutes. The mixture formed a joint compound mass of approximately 1" diameter. The mass was removed from the cup and placed into a cup of cleaning solution either whole or broken up into smaller portions of approximately ¼–½" diameter. The condition of each portion was observed approximately at one hour and at 24 hours from the time the joint compound was prepared—a period which allowed for normal setting to occur. The results appear in Table 1.

A first batch of joint compound was prepared by missing SHEETROCK® Setting-Type Joint Compound Tuf Set™ 20 at a concentration of 2000 g joint compound powder and 900 cc $H_2O$ and the joint compound mixture was pumped through an AMES®LOADING PUMP which is typically used to transfer joint compound into a final application tool. Tuf Set™ 20 was used as the joint compound for this test because it sets very hard, and when it sets up in pumps, it is not easily cleaned out by previous methods. Tuf Set™ 20 is commonly used in the manufactured housing industry where production efficiency is very important.

TABLE 1

| Solution Composition 500 cc Water | pH | 1 Hr. Result Small Portions in 500 cc Volume | 24 Hr. Result Small Portions in 50 cc Volume | 50 cc Volume |
|---|---|---|---|---|
| Water | 8.1 | Formed into recombined single solid set mass. | Formed into recombined single solid set mass. | Large mass set. |
| 10 g TKPP (2.0%) | 10.8 | Small set pieces. | Small set pieces. | Large mass set. |
| 2.5 g Citric Acid (0.5%) | 3.4 | Medium sized set chunks. | Medium sized set chunks. Set layer on bottom of cup. | Large mass set. Medium unset layer around sample. |
| 10.0 g Citric Acid (2.0%) | 3.1 | Unset | Small granular set pieces. Set layer on bottom of cup. | Large mass set. Medium unset layer around sample. |
| 2.5 g TSPP (0.5%) | 10.4 | Medium sized set chunks. | Medium sized set chunks. | Large mass set. |
| 2.5 g STPP (0.5%) | 10.1 | Small set pieces. | Medium sized set chunks. Set layer on bottom of cup. | Large mass set. Small unset layer around sample. |
| 2.5 g Zinc Hexametaphosphate (0.5%) | 8.2 | Partially unset with small set pieces. | Partially unset with small set pieces. | Large mass set. Small unset layer around sample. |
| 2.5 g $K_2HPO_4$ (0.5%) | 9.4 | Partially unset with small set pieces | Medium sized set chunks. Set layer on bottom of cup. | Large mass set. Small unset layer around sample |
| 0.5 g TKPP (0.1%) + 10 g Citric Acid (2.0%) | 3.3 | Medium sized set chucks. Set layer on bottom of cup. | Medium sized set chunks. Set layer on bottom on cup. | Large mass set. Large unset layer around sample. |
| 1.25 g TKPP (0.25%) + 10 g Citric Acid (2.0%) | 3.4 | Mostly unset with small set pieces. | Medium sized set chunks. Set layer on bottom of cup. | Large mass set. Large unset layer around sample. |
| 2.5 g TKPP (0.5% + 10 g Citric Acid (2.0%) | 3.7 | Mostly unset with small set pieces. | Mostly unset with very few small set pieces. | Large mass set. Large unset layer around sample. |
| 25.0 g TKPP (5.0%) + 10 g Citric Acid (2.0%) | 6.6 | Mostly unset with small set pieces. | Mostly unset with small set pieces. | Large mass set. Large unset layer around sample. |
| 10.0 g $Na_2PO_4$ (2.0%) + 10 g Citric Acid (2.0%) | 5.2 | Small sized set chunks. Set layer on bottom of cup. | Small sized set chunks. Set layer on bottom of cup. | Large mass set. Medium unset layer around sample. |

The results in Table 1 show that combinations of non-calcium phosphates with pH modifier will disrupt the setting of the joint compound, especially when in small portions, thereby making it easier to remove the setting type joint compound from application tools during cleaning. It should be noted that the step (f) of the preferred claimed invention (flushing with water after tool use) will rid the tool of most larger portions. Such larger portions, even if mostly set, can nevertheless be removed by the cleaning method of the invention.

EXAMPLE 2

Comparative Effectiveness of Cleaning Solutions and Methods

A cleaning solution was prepared which contained 4 wt. % each of citric acid and tetrapotassium pyrophosphate (TKPP) (560 g citric acid and 560 g TKPP in 14000 g water).

After pumping the joint compound through the pump, a sample of the joint compound was taken to determine the set time ("Vicat initial set"). The pump was then allowed to sit with the joint compound within it for 15 minutes. Afterwards, the pump was cleaned ("1st Cleaning step") with either the cleaning solution or with water (5 gal) until it pumped clear. The pump then remained immersed in the cleaning or water solution for about an additional 10 minutes. The pump was then rinsed ("1st Rinsing step") with either cleaning solution or with water (5 gal.) A second batch of joint compound was then prepared and pumped through the pump and a sample taken to measure its set time to determine any carry-over set retardation effect from the 1st cleaning solution on the second batch of joint compound. The pump was allowed to sit with joint compound in it for 15 minutes and then was cleaned ("2nd Cleaning step") and rinsed ("2nd Rinsing Step") again with the same types (and concentrations) of solutions used in the first cleaning and rinsing steps. The pump was then disassembled and checked for set pieces of joint compound remaining from the first batch of joint compound. These set pieces were then removed by a "Final Cleaning" (flushing with water, scraping, or even chiseling, as necessary), and the type of cleaning and time required to do this and restore the pump to optimum operating condition was determined. The results appear in Table 2 in the order (row by row) in which they occurred.

TABLE 2

Comparative Effect of Cleaning Solution

| Vicat initial set of first batch (min) | 30 | 32 | 31 |
|---|---|---|---|
| 1st Cleaning Step | Cleaning Solution | Cleaning Solution | Water |
| 1st Rinsing Step | Cleaning Solution | Water | Water |
| Set time of Second Batch (min) | 90 | 40–50 | 36 |
| 2nd Cleaning Step | Cleaning Solution | Cleaning Solution | Water |
| 2nd Rinsing Step | Cleaning Solution | Water | Water |
| Final Cleaning (type required) | flushing | flushing and light scraping | flushing and heavy chiseling |
| Final Cleaning (time required – min) | <1 | 5–10 | 45 |

The results in Table 2 show the relative ease of tool cleaning due to contact with the cleaning solution. The results also show that a water rinsing step is necessary to prevent a large carryover set retardation effect.

EXAMPLE 3

The method of the present invention was demonstrated by treating metal pieces having set gypsum deposited thereon with various cleaning solutions.

The cleaning solutions were prepared by mixing water with a concentrated solution of citric acid and tetrapotassium pyrophosphate (TKPP) to obtain the desired concentration. The concentrated solution contained a 1:1 weight ratio of citric acid and TKPP. Four different cleaning solution concentrations were used: 0.64 wt. %, 0.96 wt. %, 1.27 wt. % and 1.89 wt. %. The amount of each component in the cleaning solutions is shown in Table 3.

TABLE 3

Cleaning Solution Content

| | | Components of Cleaning Solution | |
|---|---|---|---|
| Cups Cleaning Solution per 5 gallons | Concentration of Cleaning Solution (wt. %) | Citric Acid (g/4000 cc $H_2O$) | TKPP (g/4000 cc $H_2O$) |
| 0.5 | 0.64 | 12.88 | 12.88 |
| 0.75 | 0.96 | 19.30 | 19.30 |
| 1.0 | 1.27 | 25.73 | 25.73 |
| 1.5 | 1.95 | 38.99 | 38.99 |

Aluminum metal pieces measuring approximately 3"×7" were coated with a joint compound comprising SHEET-ROCK® Setting-Type Joint Compound Tuf Set™ 20 manufactured by United States Gypsum Company, Chicago, Ill. which is designed to chemically set in approximately 20–30 minutes. The joint compound was mixed with water at a concentration of 120 cc $H_2O$/300 g Tuf Set™ 20 powder and had a viscosity of 320 BU (Brabender Unit) and a 29 minute Vicat set (300 g needle). The joint compound was applied to each metal piece in a 1/8" taper having a thin section (0" to 1/16") and a thick section (1/16" to 1/8") and was allowed to sit for 25 minutes to simulate jobsite tool usage.

Coated metal pieces were then placed into each of the cleaning solutions and soaked for periods of 5, 10, 15 or 20 minutes. In one series of tests 35 kHz ultrasonic energy was applied to the solution during the soaking. After soaking, the metal pieces were removed and the ease of removal of the set gypsum from the metal was evaluated. The results appear in Table 4.

TABLE 4

| Elapsed Time Since Joint Compound Mixed* | Soak Time in Solution | Joint Compound Section Thickness | Water Only Soak Only | 0.64% Cleanser Solution Soak Only | 0.96% Cleanser Solution Soak Only | 1.27% Cleanser Solution Soak Only | 1.95% Cleanser Solution Soak Only | 1.95% Cleanser Solution Ultrasonic Tank (HF Freq. 35 kHZ) |
|---|---|---|---|---|---|---|---|---|
| 30 min. | 5 min. | 0–1/16" | Water spray removed 50%. Trace scraping required. | Water spray removed 50%. Trace scraping required. | Water spray removed 75%. Trace scraping required. | Water spray removed 100%. | Water spray removed 100% easily. | Water spray removed 100%. |
| | | 1/16"–1/8" | Water spray had no effect. Slight scraping required. | Water spray had no effect. Trace scraping required. | Water spray had no effect. Trace scraping required. | Water spray had no effect. Trace scraping required. | Water spray had no effect. Trace scraping required. | Water spray had no effect. Trace scraping required. |
| 35 min. | 10 min. | 0–1/16" | Water spray had no effect. Slight scraping required. | Water spray removed 75%. Trace scraping required. | Water spray removed 50%. Trace scraping required. | Water spray removed 100%. | Water spray removed 100%. | Water spray removed 100%. |
| | | 1/16"–1/8" | Water spray had no effect. Moderate scraping required. | Water spray had no effect. Moderate scraping required. | Water spray had no effect. Slight scraping required. | Water spray had no effect. Slight scraping required. | Water spray had no effect. Slight scraping required. | Water spray had no effect. Slight scraping required. |
| 40 min. | 15 min. | 0–1/16" | Water spray had no effect. Moderate scraping required. | Water spray removed 75%. Trace scraping required. | Water spray removed 33%. Moderate scraping required. | Water spray removed 100%. | Water spray removed 100%. | Ultrasonics removed 50%. Water spray removed 50%. |
| | | 1/16"–1/8" | Water spray had | Water spray had | Water spray had no | Water spray had | Water spray had | Water spray had |

TABLE 4-continued

| Elapsed Time Since Joint Compound Mixed* | Soak Time in Solution | Joint Compound Section Thickness | Water Only Soak Only | 0.64% Cleanser Solution Soak Only | 0.96% Cleanser Solution Soak Only | 1.27% Cleanser Solution Soak Only | 1.95% Cleanser Solution Soak Only | 1.95% Cleanser Solution Ultrasonic Tank (HF Freq. 35 kHZ) |
|---|---|---|---|---|---|---|---|---|
| 45 min. | 20 min. | 0–1/16" | no effect. Moderate–Considerable scraping required. Water spray had no effect. Moderate scraping required. | no effect. Moderate scraping required. Chipped off. Water spray had no effect. Considerable scraping required. | effect. Moderate scraping required. Popped off in large chunks. Water spray removed 50%. Moderate–Considerable scraping required. | no effect. Slight scraping required. Water spray removed 100%. | no effect. Moderate scraping required. Water spray removed 100%. | no effect. Moderate scraping required. Ultrasonics removed 100%. |
| | | 1/16"–1/8" | Water spray had no effect. Considerable scraping required. | Water spray had no effect. Moderate scraping required. Chipped off. | Water spray had no effect. Moderate scraping required. Popped off in large chunks. | Water spray had no effect. Moderate scraping required. | Water spray had no effect. Moderate-Considerable scraping required. | Water spray had no effect. Considerable scraping required. |

*Joint compound had a Vicat set time of 29 minutes.

Table 4 shows that a range of cleaning solution concentrations is more beneficial than water in facilitating the removal of set gypsum. An optimum usage level can be determined by balancing the cost of using higher concentration solutions versus the additional benefit. For example, the slight extra benefit in the Table in going from the 1.27% solution to the 1.95% solution might not be justified by the additional cost of the higher concentration of components. There was also a slight extra benefit to applying ultrasonic energy to the solution during the cleaning.

While the invention is susceptible to various modifications and alternative forms, specific embodiments thereof have been shown by way of example and were herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method for minimizing the buildup of calcium sulfate dihydrate on a tool used to apply an aqueous slurry of a calcium sulfate hemihydrate-containing composition to a surface, comprising the steps of:
   (a) contacting the tool with a cleaning solution having a pH of less than about 7, said cleaning solution which comprises a non-calcium phosphate, water, and, optionally, a pH modifier;
   (b) optionally agitating the solution;
   (c) removing the tool from the cleaning solution;
   (d) rinsing the tool with water; and
   (e) using the tool to apply a calcium sulfate hemihydrate-containing composition.

2. The method of claim 1 wherein the cleaning solution comprises at least about 0.1 wt. % non-calcium phosphate.

3. The method of claim 2 wherein the cleaning solution comprises from about 0.1 wt. % to about 5 wt. % non-calcium phosphate.

4. The method of claim 3 wherein the cleaning solution comprises from about 0.1 wt. % to about 2 wt. % non-calcium phosphate.

5. The method of claim 4 wherein the cleaning solution comprises from about 0.5 wt. % to about 1 wt. % non-calcium phosphate.

6. The method of claim 5 wherein the cleaning solution comprises about 0.75 wt. % non-calcium phosphate.

7. The method of claim 1 wherein the pH modifier is citric acid.

8. The method of claim 1 wherein the pH of the cleaning solution is from about 3 to less than about 7.

9. The method of claim 8 wherein the pH of the cleaning solution is about 4.

10. The method of claim 1 wherein the non-calcium phosphate is a sodium, potassium, or ammonium salt.

11. The method of claim 10 wherein the non-calcium phosphate is chosen from the group consisting of tetrasodium pyrophosphate, tetrapotassium pyrophosphate and sodium tripolyphosphate.

12. The method of claim 11 wherein the non-calcium phosphate is tetrapotassium pyrophosphate.

13. The method of claim 1 wherein the cleaning solution comprises about 0.7 wt. % non-calcium phosphate which is tetrapotassium pyrophosphate, a pH modifier which is citric acid, and has a pH of about 4.

14. The method of claim 1 wherein the tool has set gypsum on it before it is contacted with the cleaning solution.

15. The method of claim 1 wherein calcium sulfate hemihydrate-containing composition comprises calcium sulfate hemihydrate, a thickener, a binder, and, optionally, a clay and/or a filler, and wherein said composition has a water-content of less than about 40 wt. %.

16. The method of claim 1 wherein steps (a) through (d) are repeated after the completion of step (e).

17. The method of claim 1 wherein steps (a) through (e) are repeated.

18. The method of claim 1 further comprising step (f), flushing the tool with water.

19. The method of claim 18 wherein step (f) is conducted before substantial setting of the composition on the tool.

20. The method of claim 18 wherein steps (a) through (f) are repeated.

21. The method of claim 1 comprising the step of agitating the cleaning solution while the tool is in contact with the cleaning solution.

22. The method of claim 21 wherein the cleaning solution is agitated with air bubbles.

23. The method of claim 21 wherein the cleaning solution is agitated with ultrasonic energy.

24. A method for cleaning a tool having calcium sulfate dihydrate deposited thereon comprising the steps of:
(a) contacting the tool with a cleaning solution having a pH of less than about 7, said cleaning solution which comprises a non-calcium phosphate, water, and, optionally, a pH modifier;
(b) optionally agitating the solution;
(c) removing the tool from the cleaning solution; and
(d) rinsing the tool with water.

25. The method of claim 24 wherein the cleaning solution comprises at least about 0.1 wt. % non-calcium phosphate.

26. The method of claim 24 wherein the cleaning solution comprises from about 0.1 wt. % to about 5 wt. % non-calcium phosphate.

27. The method of claim 24 wherein the cleaning solution comprises from about 0.1 wt. % to about 2 wt. % non-calcium phosphate.

28. The method of claim 27 wherein the cleaning solution comprises from about 0.5 wt. % to about 1 wt. % non-calcium phosphate.

29. The method of claim 27 wherein the cleaning solution comprises about 0.75 wt. % non-calcium phosphate.

30. The method of claim 24 wherein the pH modifier is citric acid.

31. The method of claim 24 wherein the pH of the cleaning solution is from about 3 to less than about 7.

32. The method of claim 31 wherein the pH of the cleaning solution is about 4.

33. The method of claim 24 wherein the non-calcium phosphate is a sodium, potassium, or ammonium salt.

34. The method of claim 33 wherein the non-calcium phosphate is chosen from the group consisting of tetrasodium pyrophosphate, tetrapotassium pyrophosphate and sodium tripolyphosphate.

35. The method of claim 34 wherein the non-calcium phosphate is tetrapotassium pyrophosphate.

36. The method of claim 24 wherein the cleaning solution comprises about 0.7 wt. % non-calcium phosphate which is tetrapotassium pyrophosphate, a pH modifier which is citric acid, and has a pH of about 4.

37. The method of claim 24 wherein the calcium sulfate hemihydrate-containing composition is almost completely to completely set before the tool is placed in contact with the cleaning solution.

38. The method of claim 37 wherein the calcium sulfate hemihydrate-containing composition is substantially dried before the tool is placed in contact with the cleaning solution.

39. The method of claim 24 wherein calcium sulfate hemihydrate-containing composition comprises calcium sulfate hemihydrate, a thickener, a binder, and, optionally, a clay and/or a filler, and wherein said composition has a water-content of less than about 40 wt. %.

40. The method of claim 24 comprising the step of agitating the cleaning solution while the tool is in contact with the cleaning solution.

41. The method of claim 40 wherein the cleaning solution is agitated with air bubbles.

42. The method of claim 40 wherein the cleaning solution is agitated with ultrasonic energy.

* * * * *